(12) United States Patent
Ueda et al.

(10) Patent No.: US 7,193,394 B2
(45) Date of Patent: Mar. 20, 2007

(54) METHOD OF CONTROLLING CHARGE AND DISCHARGE OF SECONDARY BATTERY FOR AUTOMATIC GUIDED VEHICLE

(75) Inventors: Toshifumi Ueda, Toyohashi (JP); Kazuhiro Ohkawa, Kosai (JP); Nobuyasu Morishita, Toyohashi (JP); Noriyuki Fujioka, Kosai (JP)

(73) Assignee: Panasonic EV Energy Co., Ltd., Shizuoka (JP)

( * ) Notice: Subject to any disclaimer, the term of this patent is extended or adjusted under 35 U.S.C. 154(b) by 202 days.

(21) Appl. No.: 10/856,535

(22) Filed: May 28, 2004

(65) Prior Publication Data

US 2004/0251870 A1  Dec. 16, 2004

(30) Foreign Application Priority Data

Jun. 13, 2003  (JP)  ............................. 2003-169679

(51) Int. Cl.
*H01M 10/44* (2006.01)
(52) U.S. Cl. ...................................... 320/128; 320/131
(58) Field of Classification Search ................ 320/132, 320/127–128, 104, 148, 150, 131
See application file for complete search history.

(56) References Cited

U.S. PATENT DOCUMENTS 5,654,868 A * 8/1997 Buer .......................... 361/256
6,545,449 B2  4/2003 Ueda et al.
6,661,201 B2  12/2003 Ueda et al.

FOREIGN PATENT DOCUMENTS

| JP | 03-273830 | 12/1991 |
|---|---|---|
| JP | 04-308429 | 10/1992 |
| JP | 2000-201438 | 7/2000 |
| JP | 2002-017049 | 1/2002 |
| JP | 2002-315218 | 10/2002 |

* cited by examiner

*Primary Examiner*—Edward H. Tso
(74) *Attorney, Agent, or Firm*—Workman Nydegger (57) ABSTRACT

To provide a method of controlling charge and discharge of a secondary battery for automatic guided vehicle that can decide the timing of refresh charge and discharge accurately and minimize the frequency of refresh charge and discharge. The method of controlling charge and discharge of a secondary battery for automatic guided vehicle comprises a first discharge step of making the secondary battery drive an automatic guided vehicle and discharge electricity with a predetermined amount; a voltage measurement step of measuring a discharge end voltage of the secondary battery at the completion of the first discharge step; and a charge step of performing a first charge step of charging the secondary battery incompletely at a first charging current value when the discharge end voltage is higher than a preset minimum voltage, and performing a second charge step of discharging the secondary battery fully and then charging the secondary battery fully at a second charging current value smaller than the first charging current value when the discharge end voltage equals the preset minimum voltage or less.

6 Claims, 5 Drawing Sheets

METHOD OF CONTROLLING CHARGE AND DISCHARGE OF SECONDARY BATTERY FOR AUTOMATIC GUIDED VEHICLE

BACKGROUND OF THE INVENTION

The present invention relates to a method of controlling charge and discharge of a secondary battery for automatic guided vehicle.

An automatic guided vehicle is used for automation and laborsaving of the delivery of materials in factories and warehouses. The automatic guided vehicle mounts a secondary battery (battery) as a power source for a traction electric motor and a driving source for other loads thereon and is controlled so as to run automatically on various driving paths along a guide line such as a guide tape adhered to the floor of factories, warehouses, etc. When the battery needs to be charged or there is no request to deliver materials from an operational control station, the automatic guided vehicle moves to a charge station as a destination and is connected to a battery charger at the charge station to charge the secondary battery.

Conventionally, a lead storage battery has been used as the secondary battery mounted on such automatic guided vehicle. However, the lead storage battery takes a long time to be charged and requires equipment for its charge and reloading as well as personnel for maintenance. Accordingly, in these days, an alkali storage battery such as nickel metal hydride battery, which is capable of being quickly charged at the charge station in a short time and requires no maintenance, has become widespread in place of lead storage battery.

Generally, an automatic guided vehicle system placed in factories comprises a minimum number of automatic guided vehicles and battery chargers essential to perform desired operations so as to reduce its total cost and prevent unnecessary space from being occupied. After the secondary battery mounted on the automatic guided vehicle supplies electric power to the loads for a few hours (the automatic guided vehicle runs automatically on the driving path), the automatic guided vehicle moves to the battery charger automatically according to an instruction of a central control unit. The battery charger charges the secondary battery quickly in a few minutes. If the nickel metal hydride battery is charged fully by quick charge, a dangerous increase in its internal pressure causes and therefore the battery is not charged fully at quick charge. As a result, incomplete charge and discharge of the secondary battery is repeated. When the nickel metal hydride battery or nickel cadmium battery is incompletely charged and discharged repeatedly without full charge, memory effect of increasing a voltage drop during discharge generates. In the case where the secondary battery with the memory effect is used for equipment in which discharge end voltage is set at a fixed value, the apparent capacity decreases with drop in voltage. For the secondary battery consisting of a plurality of single cells, voltages of respective single cells differ in proportion to accumulated discharged amount, and drop in apparent capacity and terminal voltage of the secondary battery occurs.

The above-mentioned drop in apparent capacity and terminal voltage can be resolved by discharging the secondary battery fully and then performing full charge or overcharge of the secondary battery, that is, refresh charge and discharge. A battery charge control device for automatic guided vehicle disclosed in a patent document 1 (Patent Publication No. 2560878) stores the number of battery charge times and an accumulated value of charged capacity and calculates an integrated discharged amount. When the integrated discharged amount reaches a preset amount, the device requests the user to perform equalizing charge.

A method of charging and discharging a secondary battery for automatic guided vehicle of a patent document 2 (Unexamined Patent Publication No. 2002-191103) integrates the discharged amount of the secondary battery at the side of the automatic guided vehicle, and when the integrated discharged amount reaches a preset amount, requests a battery control system to perform maintenance charge and discharge (refresh charge and discharge).

The conventional methods only measure the number of incomplete charge (or discharge) times or total discharged amount and determine the timing of refresh charge and discharge. Accordingly, even if memory effect or nonuniformity of voltages of respective single cells does not occur in fact, the methods may request refresh charge and discharge, thereby to cause congestion at the charge station and then interfere with the operation in factories equipped with the automatic guided vehicle. Moreover, there is a problem that memory effect or nonuniformity of voltages of respective single cells may not be able to be detected, resulting in sudden stop of the automatic guided vehicle.

To solve the above-mentioned conventional problems, the present invention provides a method of controlling charge and discharge of the secondary battery for automatic guided vehicle that can decide the timing of refresh charge and discharge of the secondary battery for automatic guided vehicle accurately and minimize the frequency of refresh charge and discharge.

BRIEF SUMMARY OF THE INVENTION

To solve the above-mentioned problems, the present invention has the following configuration. A method of controlling charge and discharge of the secondary battery for automatic guided vehicle from one aspect of the present invention has a first discharge step of making the secondary battery drive an automatic guided vehicle and discharge electricity with a predetermined amount; a voltage measurement step of measuring a discharge end voltage of the above-mentioned secondary battery at the completion of the above-mentioned first discharge step; and a charge step of performing a first charge step of charging the above-mentioned secondary battery incompletely at a first charging current value when the above-mentioned discharge end voltage is higher than a preset minimum voltage, and performing a second charge step of discharging the above-mentioned secondary battery fully and then charging the above-mentioned secondary battery fully at a second charging current value smaller than the above-mentioned first charging current value when the above-mentioned discharge end voltage equals the above-mentioned preset minimum voltage or less.

The present invention has the effect of realizing the method of controlling charge and discharge of the secondary battery for automatic guided vehicle that can decide the timing of refresh charge and discharge of the secondary battery for automatic guided vehicle accurately and minimize the frequency of refresh charge and discharge.

The secondary battery is a single cell or a battery pack consisting of a plurality of single cells. Preferably, the single cell is a nickel metal hydride battery or a nickel cadmium storage battery.

Preferably, the first charge step is quick charge of the secondary battery with a high current (the first charging current value). The preset minimum voltage is close to a minimum voltage at which the automatic guided vehicle using the secondary battery as a power source is operational. In the period during which the discharge end voltage when the secondary battery for automatic guided vehicle supplies electricity (discharges electricity) to loads is higher than the preset minimum voltage, the secondary battery can be used by repeating quick charge (the first charge step) and discharge (the first discharge step).

With the repetition of the first charge step and the first discharge step, the discharge end voltage lowers due to memory effect and nonuniformity of capacities of respective single cells. When the charge start voltage is smaller than the preset minimum voltage, the secondary voltage is discharged fully and then charged fully at the second charging current value smaller than the first charging current value (the second charge step). This can recover the terminal voltage lowered by memory effect and nonuniformity of capacities of respective single cells.

In the above-mentioned method of controlling charge and discharge of the secondary battery for automatic guided vehicle from another aspect of the present invention, in the above-mentioned first charge step, voltage and temperature of the above-mentioned secondary battery are monitored continuously, a preset charge end voltage is decided based on the above-mentioned temperature and charge is finished when the above-mentioned voltage equals the above-mentioned preset charge end voltage or more.

When the temperature of the secondary battery increases, its internal resistance becomes smaller. The present invention can improve control accuracy of charge by lowering the preset charge end voltage for discontinueing quick charge as the temperature increases (the dischargeable capacity at the completion of charge corresponds to a target value). It can be prevented that the life of the secondary battery is shortened due to overcharge and that a failure in the operation of the automatic guided vehicle is caused by insufficient charge.

In the above-mentioned method of controlling charge and discharge of the secondary battery for automatic guided vehicle from another aspect of the present invention, the above-mentioned preset charge end voltage is decided based on the above-mentioned first charging current value and the above-mentioned temperature.

The present invention can improve control accuracy of charge by lowering the preset charge end voltage for discontinueing quick charge as the temperature increases and the charging current value decreases (the dischargeable capacity at the completion of charge corresponds to a target value). It can be prevented that the life of the secondary battery is shortened due to overcharge and that a failure in the operation of the automatic guided vehicle is caused by insufficient charge.

In the above-mentioned method of controlling charge and discharge of the secondary battery for automatic guided vehicle from another aspect of the present invention, the above-mentioned second charge step is finished after a predetermined period from start of charge.

Preferably, the second charge step is a fixed amount charge.

In the above-mentioned method of controlling charge and discharge of the secondary battery for automatic guided vehicle from another aspect of the present invention, in the above-mentioned second charge step, temperature of the above-mentioned secondary battery is monitored continuously and charge is finished when a rate of increase per unit of time in the above-mentioned temperature becomes a predetermined value or more.

The temperature of the secondary battery rises steeply just before the completion of full charge. In the second charge step, when the rate of increase in temperature becomes a predetermined value or more, charge is finished.

In the above-mentioned method of controlling charge and discharge of the secondary battery for automatic guided vehicle from another aspect of the present invention, the above-mentioned secondary battery is a nickel metal hydride battery.

The present invention is useful as, in particular, a method of controlling charge and discharge of the nickel metal hydride battery mounted on the automatic guided vehicle.

The novel features of the invention are set forth with particularity in the appended claims. The invention as to both structure and content, and other objects and features thereof will best be understood from the detailed description when considered in connection with the accompanying drawings.

Part or All of the drawings are drawn schematically for diagrammatic representation and it should be considered that they do not necessarily reflect relative size and position of components shown therein.

DETAILED DESCRIPTION OF THE INVENTION

Embodiments that specifically describe best modes for conducting the present invention will be described referring to figures below.

First Embodiment

With reference to FIGS. 1 to 4, a method of controlling charge and discharge of a secondary battery for automatic guided vehicle in accordance with a first embodiment of the present invention will be described.

Figure 1:
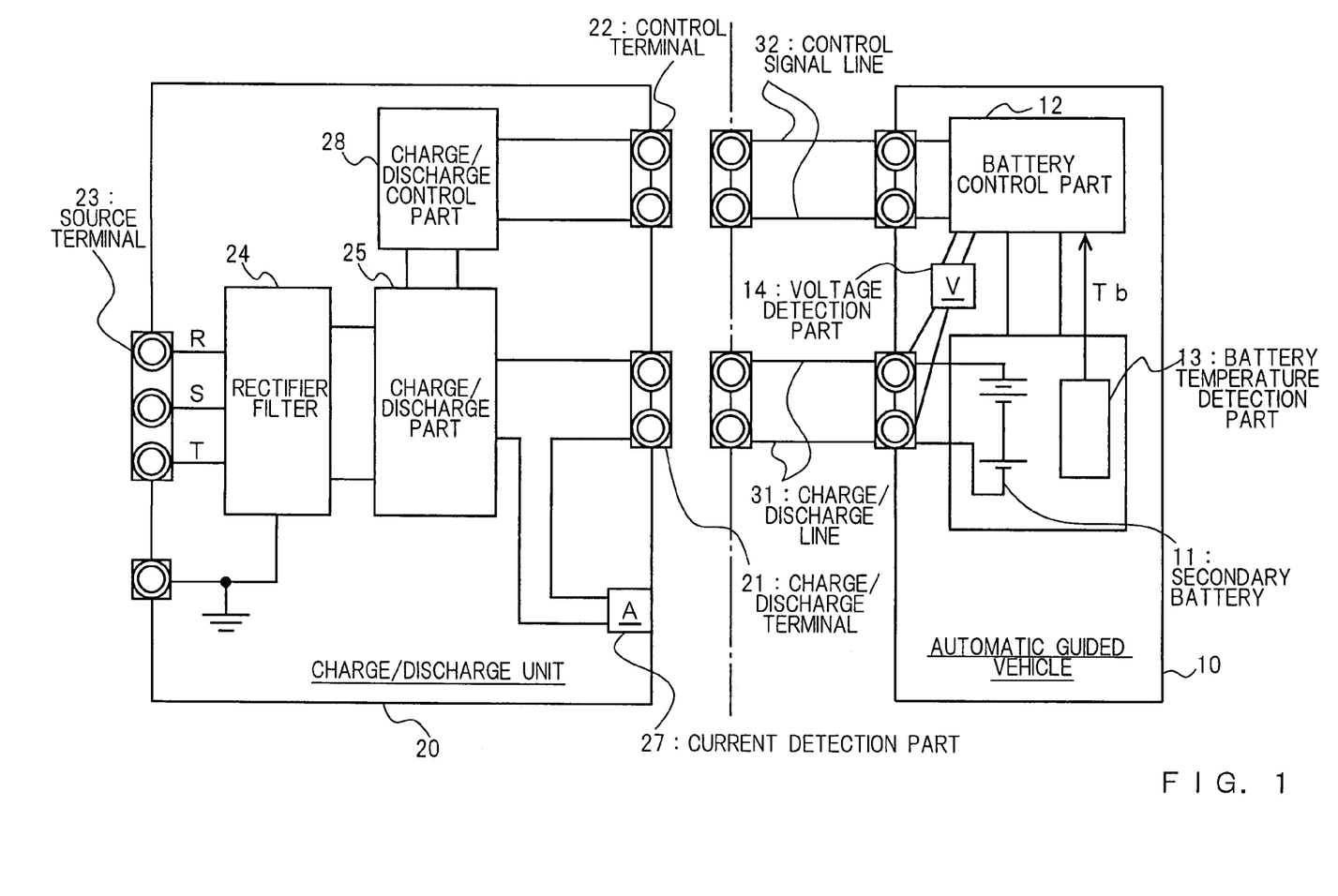
FIG. 1 is a configuration view of a system of controlling charge and discharge of automatic guided vehicle to which a method of controlling charge and discharge of a secondary battery for automatic guided vehicle in accordance with a first embodiment and a second embodiment of the present invention is applied.

FIG. 1 is a configuration view of a system of controlling charge and discharge of automatic guided vehicle to which the method of controlling charge and discharge of the secondary battery for automatic guided vehicle in accordance with the first embodiment of the present invention is applied. Reference numeral 10 denotes the automatic guided vehicle. Reference numeral 20 denotes a charge/discharge unit installed at a charge station (not shown).

There is provided a secondary battery 11 and a battery control part 12 for controlling the secondary battery 11 on the automatic guided vehicle 10. Numeral 13 denotes a battery temperature detection part and 14 denotes a voltage detection part.

The secondary battery 11 supplies electric power to a traction electric motor and other loads (not shown). The secondary battery 11 is formed of a plurality of single cells as nickel metal hydride batteries that are connected in series and in parallel with each other.

The battery temperature detection part 13 measures anyone of internal temperature, surface temperature and ambient temperature of the secondary battery 11, and transmits it to the battery control part 12. In the first embodiment, the battery temperature detection part 13 measures a surface temperature Tb of the secondary battery 11. Hereinafter, the surface temperature Tb of the secondary battery 11 is referred to as a "battery temperature Tb". The voltage detection part 14 measures voltage of the secondary battery 11 and transmits it to the battery control part 12.

In response to a departure request or delivery request from an operational control station (not shown), the battery control part 12 makes the secondary battery 11 start supplying electric power to the traction electric motor and other loads. When the automatic guided vehicle moves to the charge station and is connected to the charge/discharge unit 20 via a charge/discharge line 31 and a control signal line 32, the battery control part 12 discontinues supply of electric power by the secondary battery 11 to the traction electric motor and other loads. Further, the battery control part 12 transmits data on the battery temperature Tb and a battery voltage V to the charge/discharge unit 20 through the control signal line 32.

The charge/discharge unit 20 has a charge/discharge terminal 21, a control terminal 22, a source terminal 23, a rectifier filter 24, a charge/discharge part 25, a current detection part 27 and a charge/discharge control part 28. The charge/discharge terminal 21 is connected to the charge/discharge line 31. The control terminal 22 is connected to the control signal line 32. The source terminal 23 is connected to an AC power source. The rectifier filter 24 rectifies an AC source voltage from the source terminal 23, transforms the rectified voltage to the DC source voltage and supplies the transformed voltage to the charge/discharge part 25. The current detection part 27 detects a charge/discharge current sent to the secondary battery 11.

The charge/discharge control part 28 controls the charge/discharge part 25 based on the battery temperature Tb and voltage received from the automatic guided vehicle 10 and the current received from the current detection part 27. The charge/discharge part 25 charges or discharges the secondary battery 11 based on the control signal sent from the charge/discharge control part 28.

The automatic guided vehicle 10 is driven by discharge of the secondary battery 11, performs its operation, moves to the charge station every predetermined timing according to a preset program (for example, every one hour) and is charged quickly by the charge/discharge unit 20 according to a first charge control method (described later). The quick charge is set to be performed when the state of charge of the secondary battery 11 (the ratio (%) of the current dischargeable capacity to the dischargeable capacity at full charge) is the order of 65%. The quick charge finishes when the state of charge of the secondary battery 11 reaches 75%. In the quick charge according to the first charge control method, as the secondary battery 11 is not charged fully, increase in internal pressure of the secondary battery 11 can be prevented. The secondary battery 11 is used in the state of charge of 65 to 75%.

Figure 3:
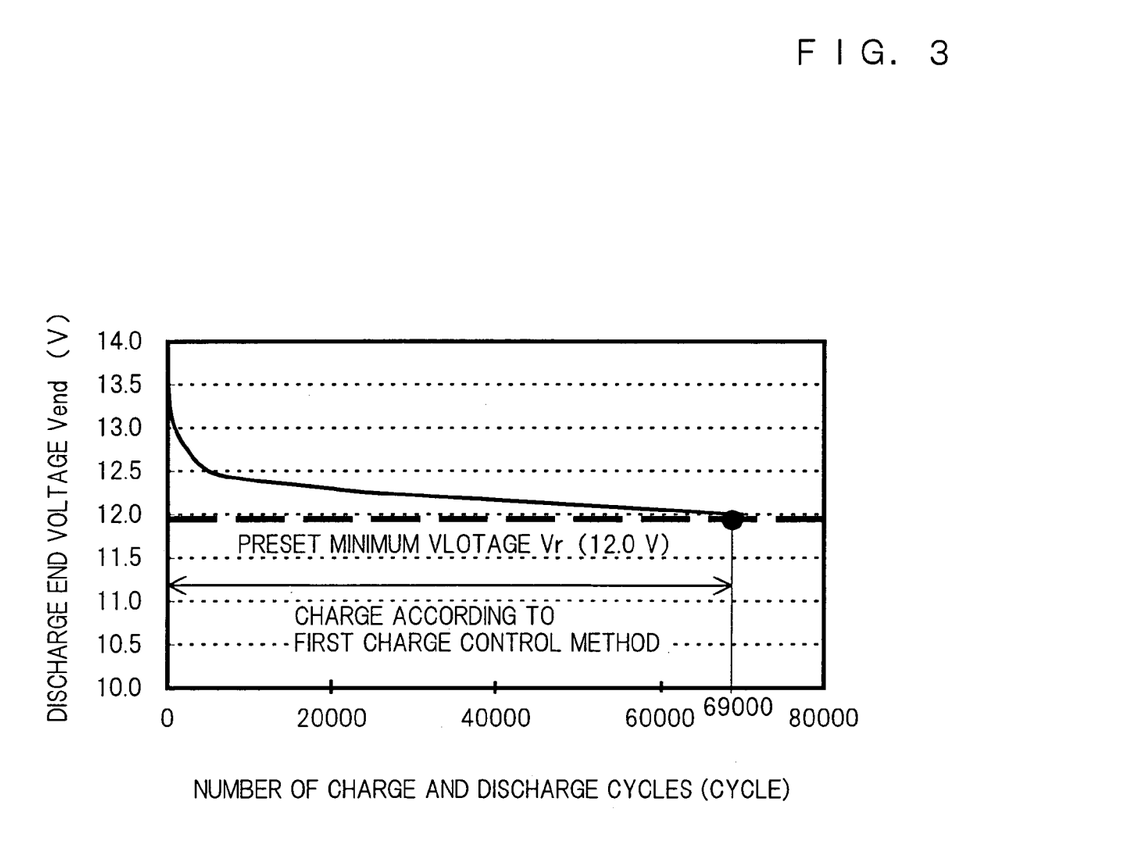
FIG. 3 is a graph showing the change in a discharge end voltage Vend to the number of charge and discharge cycles.

FIG. 3 is a graph showing the change in a discharge end voltage Vend (when the automatic guided vehicle 10 is connected to the charge/discharge unit) to the number of charge and discharge cycles of quick charge (incomplete charge) and slight discharge. At each cycle, the secondary battery 11 is charged with electricity with a certain amount to go into a state of charge of 75% from a state of charge of 65%, and discharges electricity with a certain amount to go into a state of charge of 65% from a state of charge of 75%. As the charge and discharge cycle is repeated, the discharge end voltage Vend lowers and when the discharge end voltage Vend is below a preset minimum voltage Vr (12.0 in the first embodiment), the secondary battery 11 cannot supply sufficient power to the loads. Memory effect is one of the factors of lowering the discharge end voltage Vend. Since the discharged amount from the start to the completion of discharge is substantially constant each time (the battery discharges electricity from a state of charge of 75% to a state of charge of 65% each time), discharge voltage drop due to memory effect is accumulated and the discharge end voltage Vend lowers gradually. Nonuniformity of voltages of respective single cells constituting the secondary battery 11 also lowers the discharge end voltage Vend. In the first embodiment, when the discharge end voltage Vend becomes the preset minimum voltage Vr or less, the secondary battery 11 is discharged fully and charged fully at a low current to resolve voltage drop.

Figure 2:
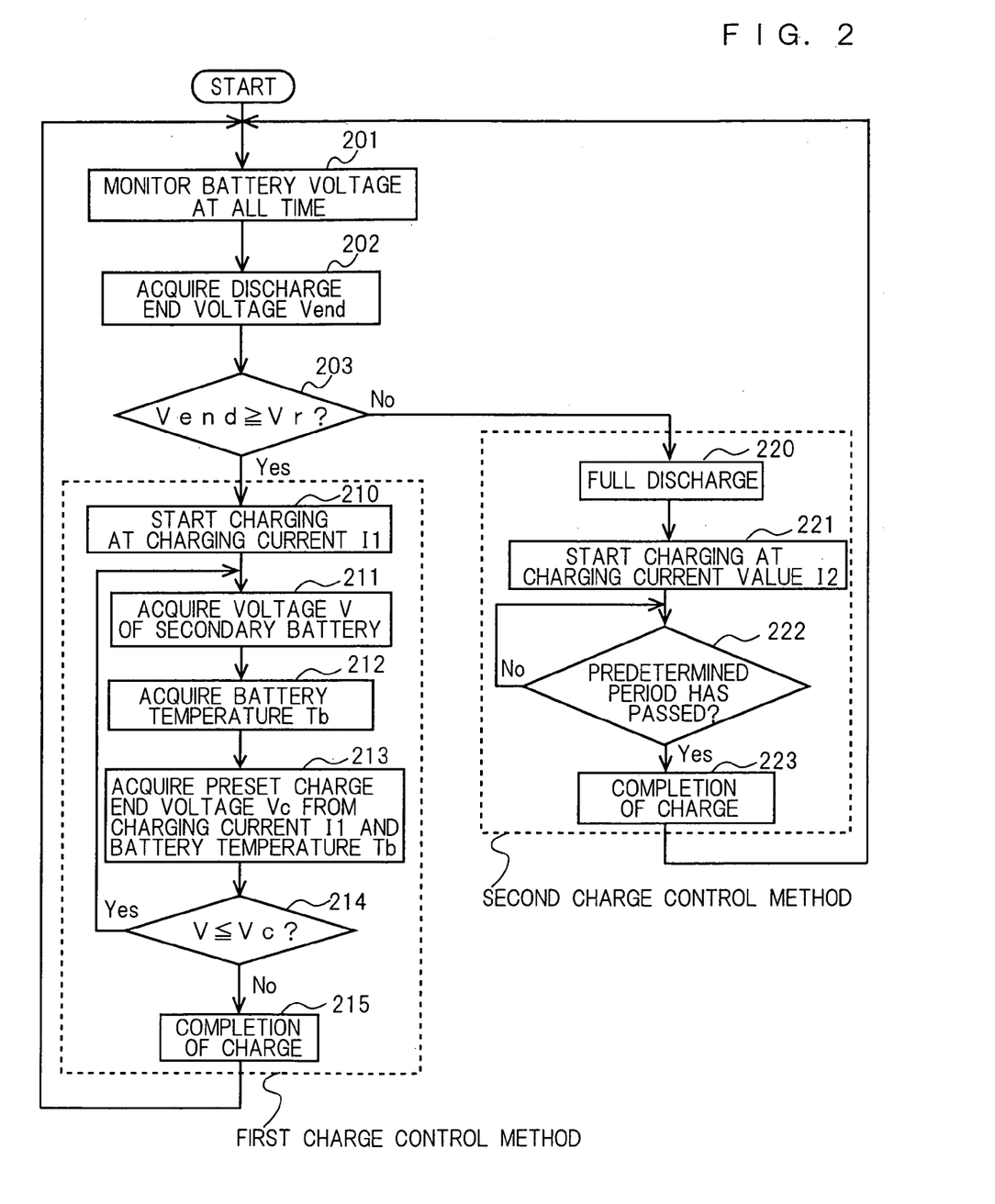
FIG. 2 is a flow chart of the method of controlling charge and discharge of a secondary battery for automatic guided vehicle in accordance with the first embodiment of the present invention.

FIG. 2 is a flow chart of the method of controlling charge and discharge of the secondary battery in accordance with the first embodiment of the present invention. Preferably, the automatic guided vehicle 10 is connected to the charge/discharge unit 20 each time it discharges electricity with a substantially constant amount. The battery control part 12 monitors voltage of the secondary battery 11 through the voltage detection part 14 at all times (step 201). At a step 202, the discharge end voltage Vend is acquired. At a step 203, it is determined whether or not the discharge end voltage Vend equals the preset minimum voltage Vr or more. When the discharge end voltage Vend equals the preset minimum voltage Vr or more, the operation proceeds to a step 210.

The charge/discharge control part 28 switches the charge/discharge part 25 to a charger, controls a charging current value I1 received from the current detection part 27 to be 200 A, and start quick charge (step 210). At a step 211, the charge/discharge control part 28 acquires the voltage V of the secondary battery 11 measured by the voltage detection part 14 from the battery control part 12 through the control signal line 32. At a step 212, the charge/discharge control part 28 acquires the battery temperature Tb from the battery control part 12 through the control signal line 32.

Figure 4:
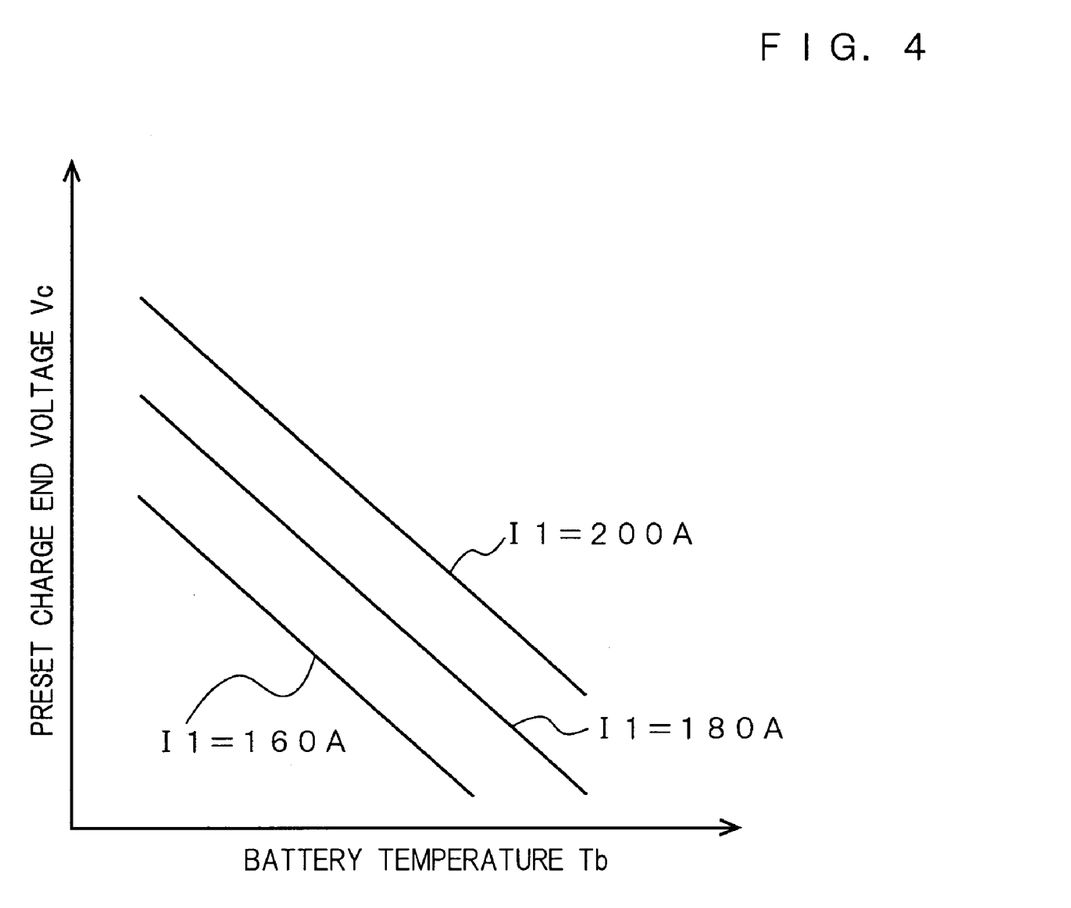
FIG. 4 is a graph showing function expression of a preset charge end voltage Vc to the battery temperature Tb of the secondary battery 11 in the case of charge at the charging current value I1 of 160 A, 180 A and 200 A.

FIG. 4 is a graph showing function expression of a preset charge end voltage Vc to the battery temperature Tb of the secondary battery 11 in the case of charge at the charging current value I1 of 160 A, 180 A and 200 A. The function expression is set so that the state of charge at the completion of charge is 75%. The preset charge end voltage Vc is a linear function of the battery temperature Tb by applying the charging current value I1 as a parameter. As the battery temperature Tb becomes higher and the charging current value I1 becomes lower, the preset charge end voltage Vc becomes lower. The charge/discharge control part 28 stores the function expression in FIG. 4 for each charging current value I1.

Control accuracy of charge of the secondary battery 11 can be improved (dischargeable capacity at the completion of charge corresponds to a target value) by lowering the preset charge end voltage Vc for discontinuing quick charge (by deciding the preset charge end voltage Vc according the function expression in FIG. 4) as the battery temperature Tb becomes higher and the charging current value I1 becomes smaller. It can be prevented that the life of the secondary battery 11 is shortened due to overcharge and that a failure in the operation of the automatic guided vehicle is caused by insufficient charge.

Returning to FIG. 2, at a step 213, the charge/discharge control part 28 acquires the preset charge end voltage Vc from the charging current value I1 and the battery temperature Tb (according to the function expression in FIG. 4). It is determined whether or not the voltage V of the secondary battery 11 equals the preset charge end voltage Vc or more (step 214). When the voltage V of the secondary battery 11 equals the preset charge end voltage Vc or less, the operation returns to a step 211 and continues quick charge. When the voltage V of the secondary battery 11 is higher than the preset charge end voltage Vc, quick charge is finished (step 215). The automatic guided vehicle 10 start running and leaves the charge station. The operation returns to the step 201. At the steps 210 to 215, charge is conducted according to the first charge control method. As mentioned above, since the secondary battery 11 is not charged fully in quick charge according to the first charge control method, increase in internal pressure of the secondary battery 11 can be prevented. Further, since the secondary battery 11 is charged with a high current in a first charge control method, charge can be completed in a short time (many secondary batteries 11 for automatic guided vehicle can be maintained by a small number of charge/discharge units).

In the case where it is determined that the discharge end voltage Vend is smaller than the preset minimum voltage Vr at the step 203, the operation proceeds to a step 220. The charge/discharge control part 28 switches the charge/discharge part 25 to a discharger and discharges the battery 11 until the voltage acquired from the battery control part 12 reaches the discharge end voltage (full discharge) (step 220). The charge/discharge control part 28 switches the charge/discharge part 25 to a charger, controls a charging current value I2 received from the current detection part 27 to be 10 A, and starts charging (step 221). The charging current value I2 is smaller than the charging current value I1 according to the first charge control method. Charge is continued for a predetermined period (step 222). The predetermined period at the step 222 is set to be a period necessary for full charge of the secondary battery 11. Charge is finished at a step 223. The operation returns to the step 201. At the steps 220 to 223, charge is conducted according to a second charge control method.

Since the secondary battery 11 is discharged fully at the step 220 and charged fully according to the second charge control method, it is possible to equalize memory effect on the secondary battery 11 and the dispersion of voltages of respective single cells. Since the secondary battery 11 is charged fully with a relatively low current in the second charge control method, damage of the secondary battery 11 due to rapid increase in its internal pressure can be prevented.

Second Embodiment

Figure 5:
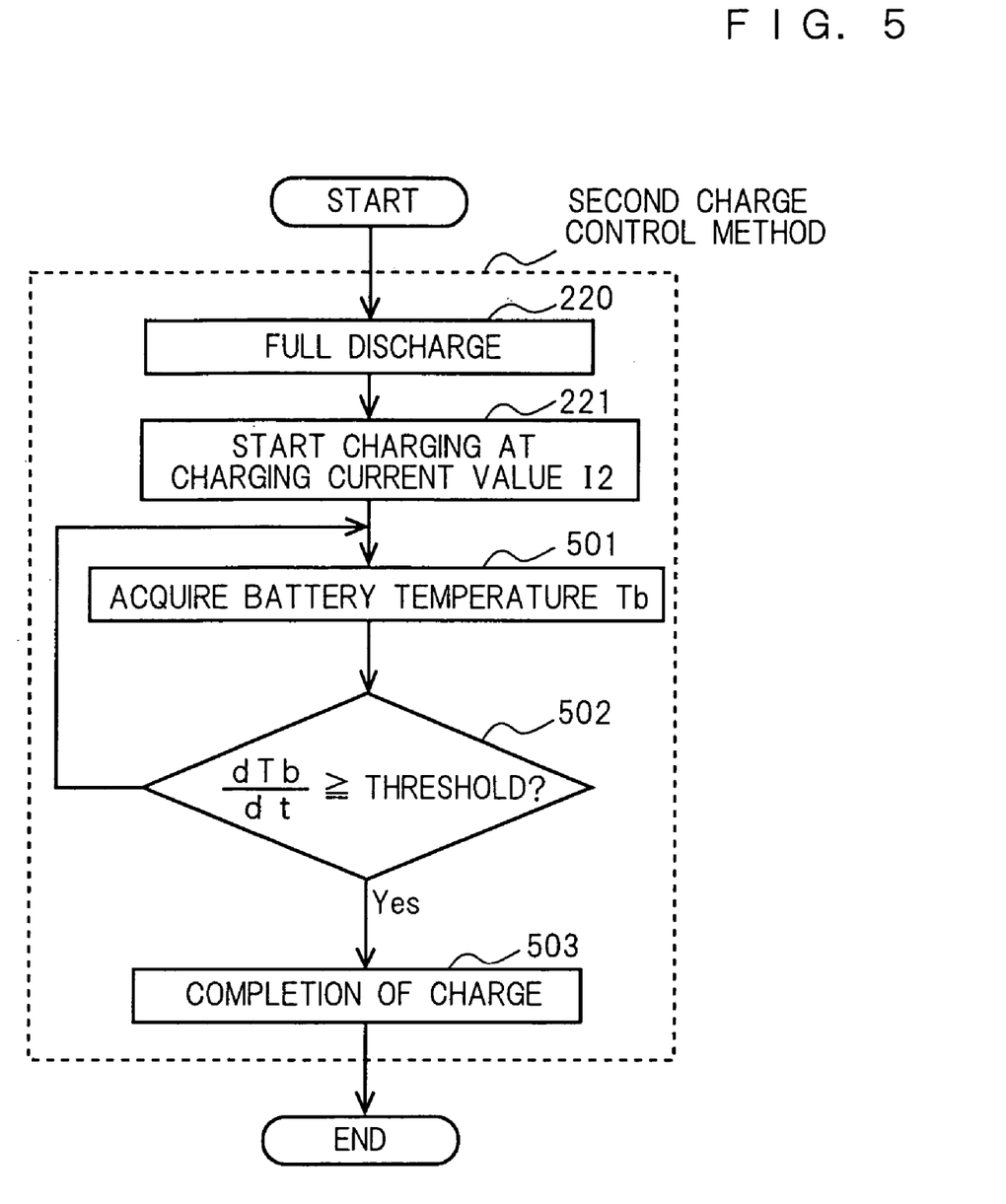
FIG. 5 is a flow chart of a second charge control method in accordance with the second embodiment of the present invention.

Referring to FIG. 1 and FIG. 5, a method of controlling charge and discharge of a secondary battery for automatic guided vehicle in accordance with a second embodiment of the present invention will be described. The method of controlling charge and discharge of the secondary battery for automatic guided vehicle in accordance with the second embodiment applies to the same system of controlling charge and discharge of the automatic guided vehicle 10 as in the first embodiment (FIG. 1). FIG. 1 has been already described above.

The method of controlling charge and discharge of a secondary battery for automatic guided vehicle in accordance with a second embodiment is different from the method of the first embodiment only in the second charge control method. Specifically, the steps 221 to 223 in FIG. 2 (the second charge control method) are replaced with steps 220, 221 and 501 to 503 in FIG. 5. Only the different steps in the second embodiment will be described below.

FIG. 5 is a flow chart of the method of controlling charge and discharge of a secondary battery for automatic guided vehicle in accordance with the second embodiment. After full discharge (step 220), the charge/discharge control part 28 switches the charge/discharge part 25 to a charger, controls a charging current value I2 received from the current detection part 27 to be 10 A, and starts charging (step 221). The charging current value I2 is smaller than the charging current value I1 according to the first charge control method. At a step 501, the charge/discharge control part 28 acquires the battery temperature Tb from the battery control part 12 through the control signal line 32. At a step 502, the charge/discharge control part 28 calculates a time variation rate $dTb/dt$ (t is time) and determines whether or not the rate equals a threshold value or more. When the rate is smaller than the threshold value, the operation returns to a step 501 and charge is continued. When the rate equals the threshold value or more, the operation proceeds to a step 503 and charge is finished.

The temperature Tb of the secondary battery 11 increases with the progress of charge and the rate of increase per unit of time rises steeply just before the completion of full charge. Therefore, full charge can be detected by the rate of increase of the battery temperature Tb.

According to the present invention, it is possible to obtain an advantageous effect of realizing a method of controlling charge and discharge of the secondary battery for automatic guided vehicle that accurately judges the timing of refresh charge and discharge of the secondary battery for automatic guided vehicle and minimizes the frequency of refresh charge and discharge.

While preferred embodiments of the present invention have been described in detail to a certain degree, it is to be understood that, within the scope and spirit of the claims made herein, the invention may be practiced otherwise than as specifically described herein, the invention may be modified in arrangement and detail without departing from such scope and spirit.

The invention claimed is:

1. A method of controlling charge and discharge of a secondary battery for automatic guided vehicle comprising:
   a first discharge step of making the secondary battery drive an automatic guided vehicle and discharge electricity with a predetermined amount;
   a voltage measurement step of measuring a discharge end voltage of said secondary battery at the completion of said first discharge step; and a charge step of performing a first charge step of charging said secondary battery incompletely at a first charging current value when said discharge end voltage is higher than a preset minimum voltage, and performing a second charge step of discharging said secondary battery fully and then charging said secondary battery fully at a second charging current value smaller than said first charging current value when said discharge end voltage equals said preset minimum voltage or less.

2. A method of controlling charge and discharge of a secondary battery for automatic guided vehicle as stated in claim 1, wherein, in said first charge step, voltage and temperature of said secondary battery are monitored continuously, a preset charge end voltage is decided based on said temperature and charge is finished when said voltage equals said preset charge end voltage or more.

3. A method of controlling charge and discharge of a secondary battery for automatic guided vehicle as stated in claim 2, wherein said preset charge end voltage is decided based on said first charging current value and said temperature.

4. A method of controlling charge and discharge of a secondary battery for automatic guided vehicle as stated in claim 1, wherein said second charge step is finished after a predetermined period from start of charge.

5. A method of controlling charge and discharge of a secondary battery for automatic guided vehicle as stated in claim 1, wherein, in said second charge step, temperature of said secondary battery is monitored continuously and charge is finished when a rate of increase per unit of time in said temperature equals a predetermined value or more.

6. A method of controlling charge and discharge of a secondary battery for automatic guided vehicle as stated in claim 1, wherein said secondary battery is a nickel metal hydride battery.

* * * * *